United States Patent [19]

Shimegi et al.

[11] Patent Number: 5,278,819
[45] Date of Patent: Jan. 11, 1994

[54] DISK STORAGE DEVICE HAVING A CARRIAGE LOCKING MECHANISM

[75] Inventors: Hiroo Shimegi; Hidemitsu Fujisawa; Manabu Ogura; Yutaka Hashioka; Kuzuhito Sakota, all of Amagasaki; Masayuki Suzuki, Tokorozawa; Keiji Uehara, Iruma; Yoshiki Kirinoe, Toshima; Yasushi Noda, Suginami, all of Japan

[73] Assignee: Mitsubishi Electric Corp and Teac Corp., Japan

[21] Appl. No.: 819,454

[22] Filed: Jan. 10, 1992

[30] Foreign Application Priority Data

Jan. 16, 1991 [JP] Japan .................................... 3-3482

[51] Int. Cl.$^5$ .............................................. G11B 5/55
[52] U.S. Cl. .................... 369/215; 360/99.060; 360/105
[58] Field of Search ................... 369/215; 360/99.06, 360/99.02, 105

[56] References Cited

U.S. PATENT DOCUMENTS

| | | | |
|---|---|---|---|
| 4,472,796 | 9/1984 | Torrington | 369/77.2 |
| 4,685,010 | 8/1987 | Tronzano | 360/99.06 |
| 4,899,328 | 2/1990 | Ishii et al. | 360/109 |
| 4,987,506 | 1/1991 | Uehara | 360/105 |
| 5,060,101 | 10/1991 | Isomura | 360/99.06 |

Primary Examiner—Stuart S. Levy
Assistant Examiner—Kevin M. Watkins
Attorney, Agent, or Firm—Andrus, Sceales, Starke & Sawall

[57] ABSTRACT

A disk storage device includes a head part which writes data into a storage disk loaded into the disk storage device and reads data from the storage disk, a linear actuator moving the head part in radial directions of the storage disk, an eject member which is operated when the storage disk is ejected, and a movement mechanism which moves the storage disk to an eject portion in response to an operation of the eject member and which moves the storage disk to a read/write position. A lock part, which has a lock member cooperating with the movement mechanism, keeps, in response to the operation of the eject member, the head part stationary at the eject position by the lock member which engages with one of the head part and the linear actuator.

10 Claims, 9 Drawing Sheets

DISK STORAGE DEVICE HAVING A CARRIAGE LOCKING MECHANISM

BACKGROUND OF THE INVENTION (1) Field of the Invention

The present invention generally relates to disk storage devices, such as magnetic disk drives or magneto-optic disk devices. More particularly, the present invention is concerned with a disk storage device having a mechanism for keeping a head part stationary in an eject mode.

(2) Description of the Prior Art

An magneto-optic storage device is known as a read/write storage device. In a read/write mode of the magneto-optic disk device, an optical head is moved in the radial directions of a storage disk by means of a linear actuator after the storage disk is loaded into the magneto-optic disk device. This linear actuator is composed of a pair of rod cores which run in the radial directions of the disk, a pair of coils wound around the pair of road cores, and a supporting base which is provided between the pair of coils and which supports the optical head. The optical head accommodates precision parts, such as a group of lenses of an optical system. In the read/write mode, a coil of the linear actuator is supplied with electricity. The optical head is moved along the rod cores due to a electromagnetic force derived from the coil. In this manner, a tracking operation is carried out.

The supporting base supporting the optical head is guided by guide shafts and moved along the rod cores by the linear actuator. After the storage disk is ejected from the disk storage device, the optical head is moved to an initializing position corresponding to an innermost track on the storage disk, and then supply of electricity to the coil is stopped. In this state, the optical head is free to move along the rod cores between the innermost and outermost tracks. In this state, if a vibration is applied to the disk storage device or the disk storage device is tilt, a large magnitude of force could be exerted on the optical head, and hence the optical head might forcibly fit against stoppers located at the innermost and outermost tracks. Hence, the precision parts of the optical system forming the optical head may be damaged.

SUMMARY OF THE INVENTION

It is a general object of the present invention to provide a disk storage device in which the above disadvantages are eliminated.

A more specific object of the present invention is to provide a disk storage device having a mechanism from preventing a head from freely moving along guide members in a state where a storage disk has been ejected from the disk storage device.

The above objects of the present invention are achieved by a disk storage device comprising: a head part which writes data into a storage disk loaded into the disk storage device and read data from the storage disk; a linear actuator moving the head part in radial directions of the storage disk; an eject member which is operated when the storage disk is ejected; a movement mechanism which moves the storage disk to an eject portion in response to an operation of the eject member and which moves the storage disk to a read/write position; and lock means having a lock member cooperating with the movement mechanism, for keeping, in response to the operation of the eject member, the head part stationary at the eject position by the lock member which engages with one of the head part and the linear actuator.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Referring to FIGS. 1 through 4, there is illustrated a disk storage device according to an embodiment of the present invention. An magneto-optic device 1 includes a chassis 2, and a turn table 3 rotatably supported by an upper surface of the chassis 2. A storage disk (not shown) is placed on the turn table 3. A linear actuator 5, which moves an optical head 4 in radial directions A and B, is provided in the rear of the turn table 3.

Figure 1:
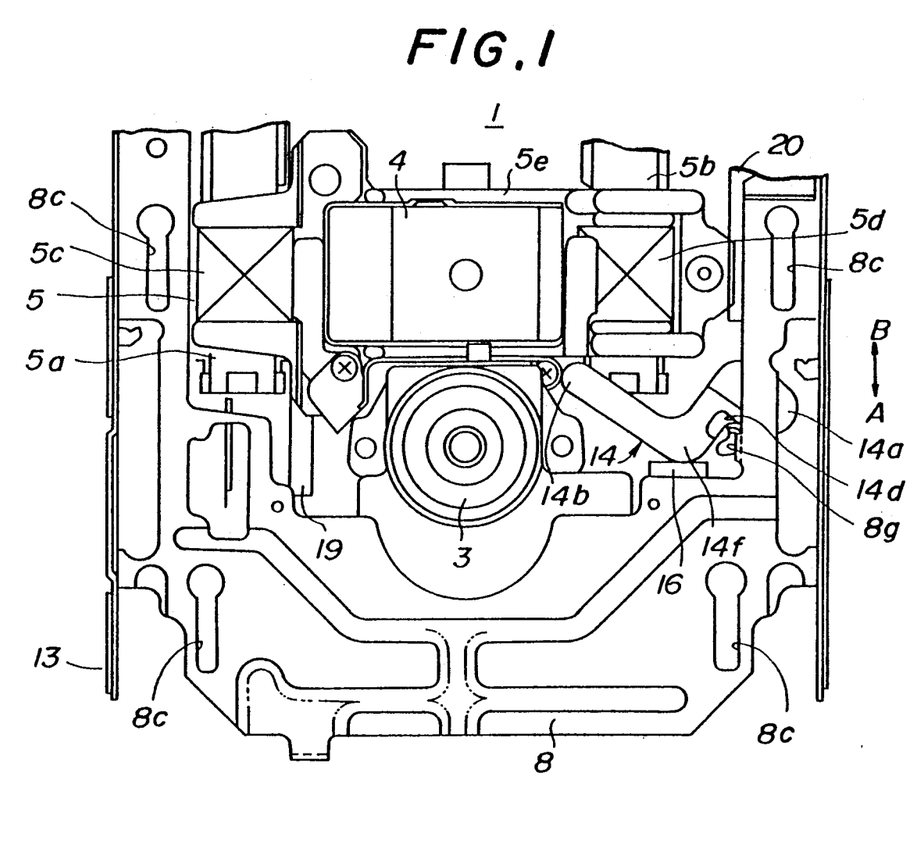
FIG. 1 is a plan view of an an essential part of a disk storage device according to an embodiment of the present invention.
Figure 2:
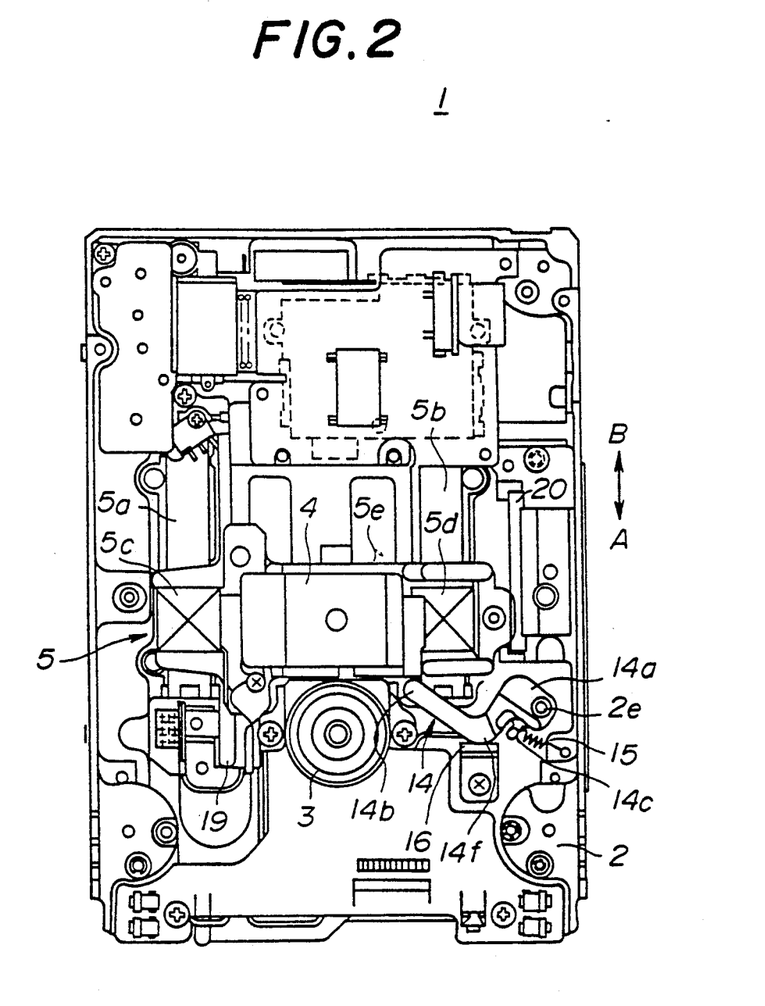
FIG. 2 is a plan view of the disk storage device from which a holder and a slider have been removed.
Figure 3:
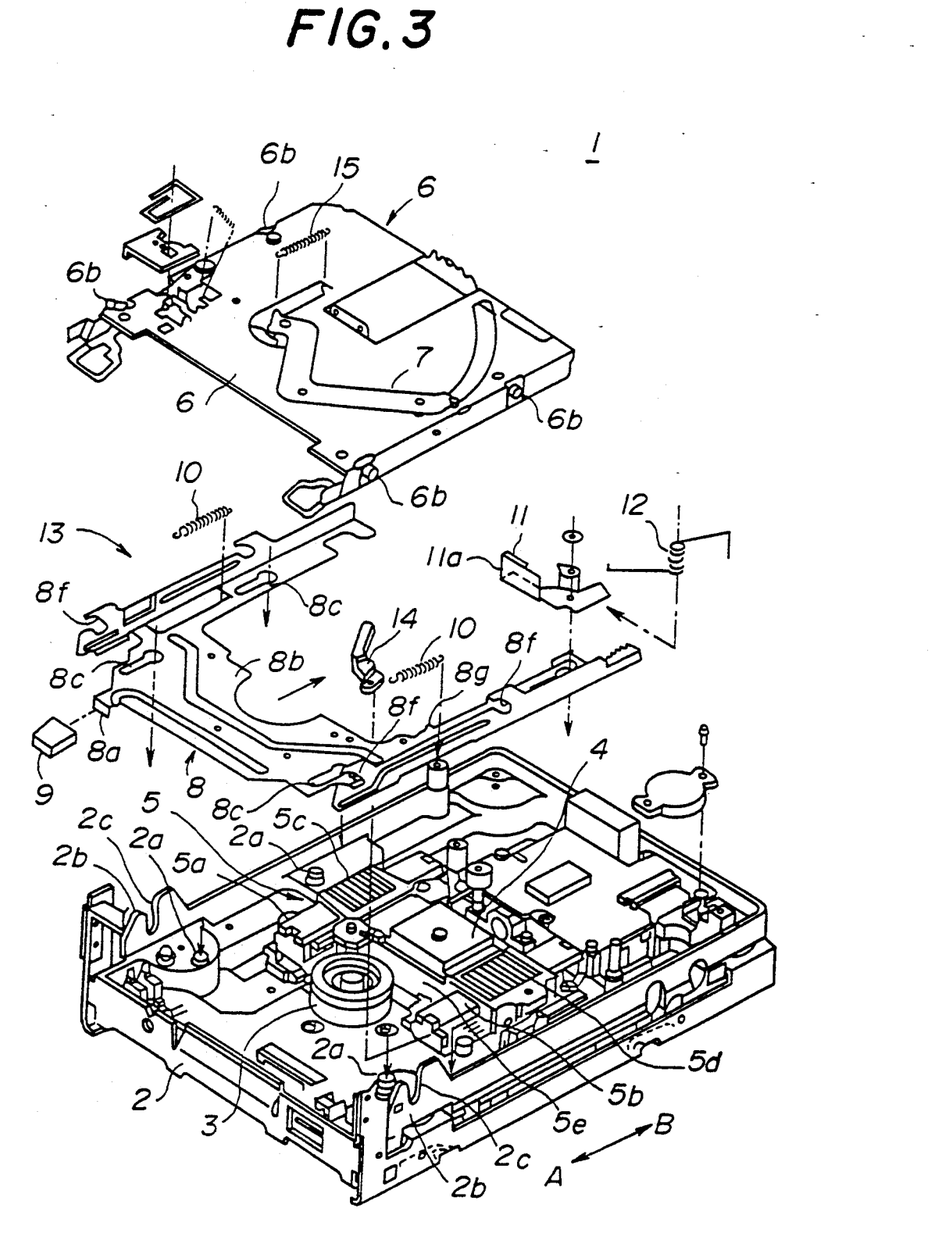
FIG. 3 is an exploded perspective view of the disk storage device.

The linear actuator 5 is composed of a pair of road cores 5a and 5b which runs in the directions A and B, coils 5c and 5d wounded around the road cores 5a and 5b, and a supporting base 5e. The coils 5c and 5d are supported by both ends of the supporting base 5e. When the coils 5c and 5d are supplied with electricity, the linear actuator 5 moves the supporting base 5e together with the optical head 4 due to an electromagnetic force derived from the coils 5c and 5d.

Figure 6:
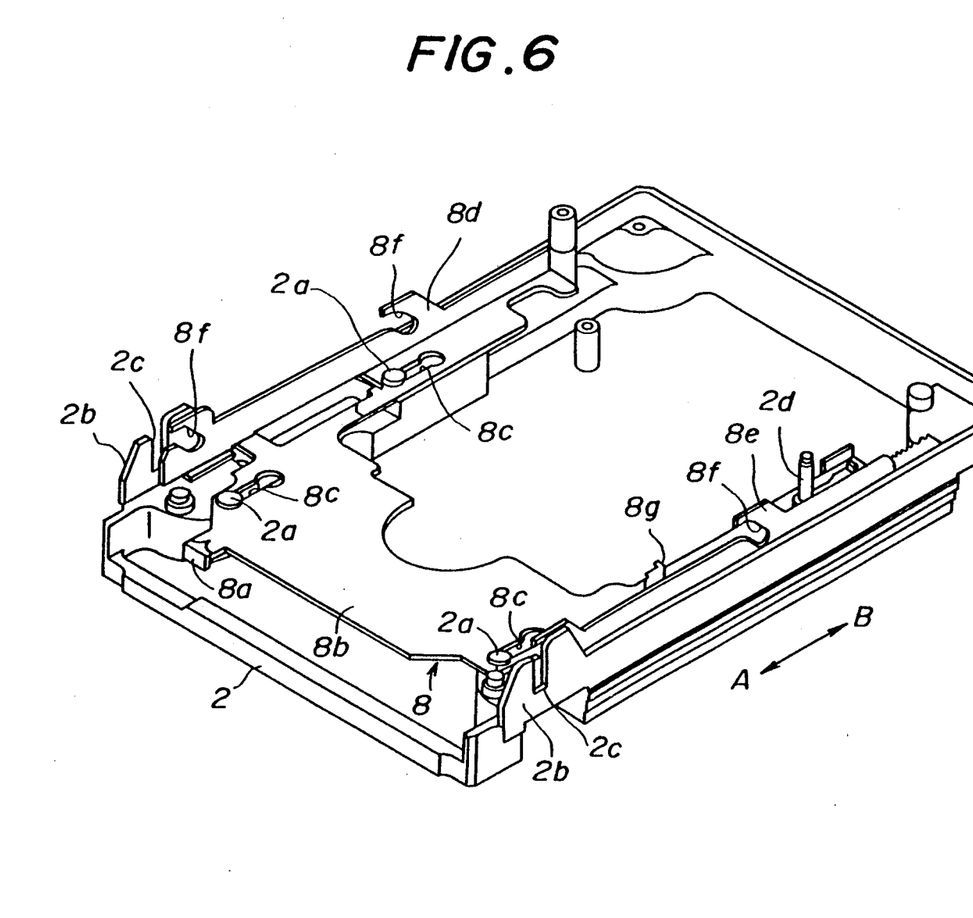
FIG. 6 is a perspective view of the disk storage device in which the slider has been mounted on a chassis.

A holder 6 accommodates a disk cartridge (not shown). A pivotable arm 7, which opens a shutter of the disk cartridge, is rotatably fixed to a headlining board of the holder 6. A pair of projections 6b is provided on each of the opposed sides of the holder 6. A slider 8 is provided between the chassis 2 and the holder 6 so that it is slidable. An eject button 9 is fixed to a front end 8a of the slider 8. The slider 8 has a substantially U-shaped part when it is viewed from the upper (or lower side) of the slider 8. Long holes 8c, which run in the radial directions of the storage disk, are formed in a flat part 8b of the slider 8. As shown in FIG. 6, guide pins 2a which project from the chassis 2 are inserted into the long holes 8c. The movement of the slider 8 is limited to the directions A and B by the guide pins 2a.

Figure 7:
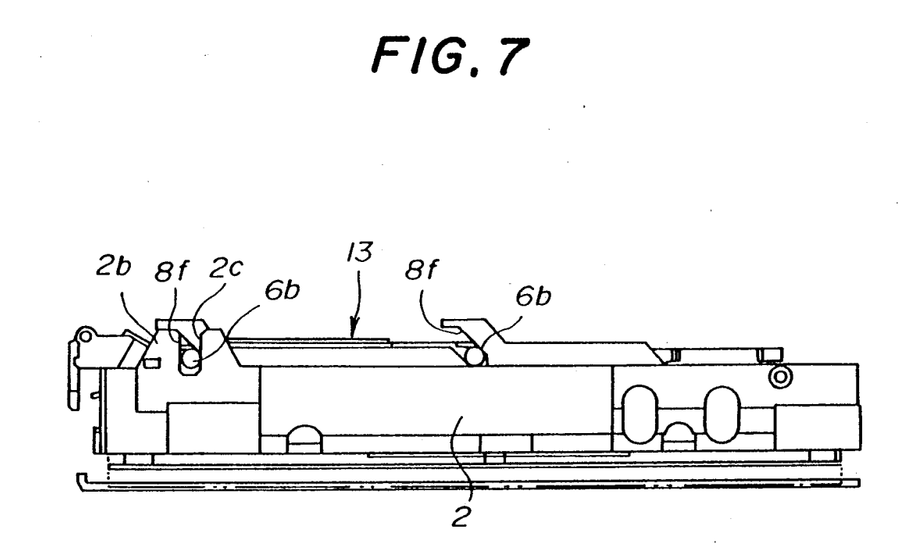
FIG. 7 is a side view of the disk storage device into which a storage disk has been loaded.

The slider 8 has side walls 8d and 8e which are located on both sides of the flat part 8b and stand uprightly. A slope groove 8f, which engages with the projection 6b, is formed in each of the side walls 8d and 8e. As shown in FIG. 7, the projections 6b of the holder 6 penetrate the slope grooves 8f and are inserted into grooves 2c formed in supporting parts 2b which project from the chassis 2. With this arrangement, the projections 6b slide along the slope grooves 8f when the slider 8 moves in the direction A or B, and hence the holder 6 is moved upwardly or downwardly. That is, the holder 6 is upwardly moved when the storage disk is ejected from the holder 6, and downwardly moved when the storage disk is loaded therein. The slider 8 has an engagement part 8g on the inner side of the flat part 8b having the substantially U-shaped portion, and is urged in the direction due to the function of a tension stress of coil springs 10. As will be described later, the engagement part 8g is downwardly bent so that it engages with a lock lever 14.

A latch lever 11 (FIG. 3) is rotatably supported by a pin 2d, and urged counterclockwise by a force generated by a torsion spring 12. When the disk cartridge is inserted into the holder 6, the engagement part 11a of the latch lever 11 is pressed and hence the latch lever 11 is counterclockwise turned and the slider 8 is released from the engagement state. Hence, the disk cartridge is placed in a write/read position, and the slider 8 is displaced in the direction A due to the function of the force generated by the coil springs 10. When the eject button 9 is depressed in the direction B, the latch lever 11 is counterclockwise turned due to the function of the force generated by the torsion spring 12, so that the disk cartridge in the holder 6 is ejected therefrom in the direction A.

A movement mechanism 13 for moving the disk to an eject position or the write/read position is composed of the holder 6, the slider 8, the latch lever 11 and the torsion spring 12.

A lock lever (lock member) 14 comes into contact with with the supporting base 5e of the linear actuator 5 when the disk is ejected from the holder 6. The lock lever 14 is rotatably supported by a shaft 2e embedded in the chassis 2. The lock lever 14 is counterclockwise urged by the coil spring 15, and spaced apart from the linear actuator 5 in the write/read mode (in which the disk has been loaded).

Figure 4:
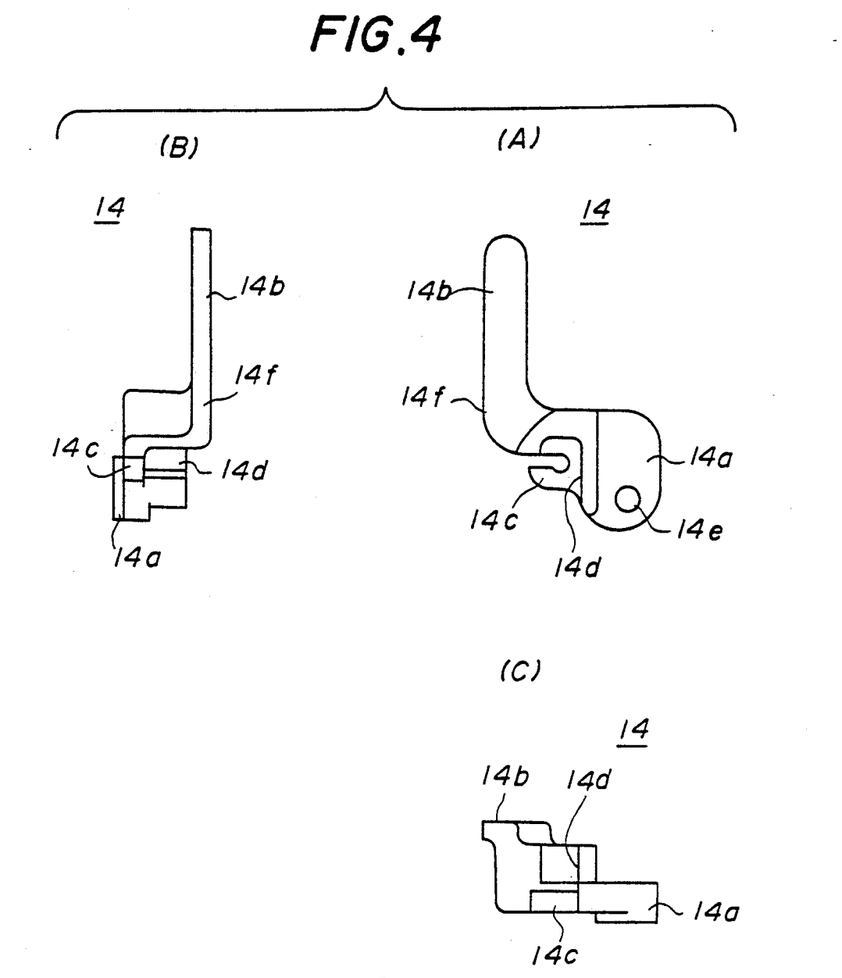
FIG. 4 is a diagram of a lock lever.

As shown in FIG. 4, the lock lever 14 is composed of a base 14a, an arm part 14b, a hook part 14c, and a wall 14d. The base 14a is mounted on the chassis 2. The arm part 14b is a substantially L-shaped part extending from a position higher than that of the base 14a. The coil spring 15 is hooked up at the hook part 14c. The engagement part 8g of the slider 8 engages with the wall 14d. A hole 14e is formed in the base 14a. The shaft 2e embedded in the chassis 2 penetrates the hole 14e. The arm part 14b includes long and short arm parts and the long arm part turns around the short arm part.

A stopper 16 of the lock lever 14 is secured to the chassis 2. Since the lock lever 14 is counterclockwise urged by the coil spring 15, a corner portion 14f of the arm part 14b is in engagement with the stopper 16 in the write/read mode.

Figure 8:
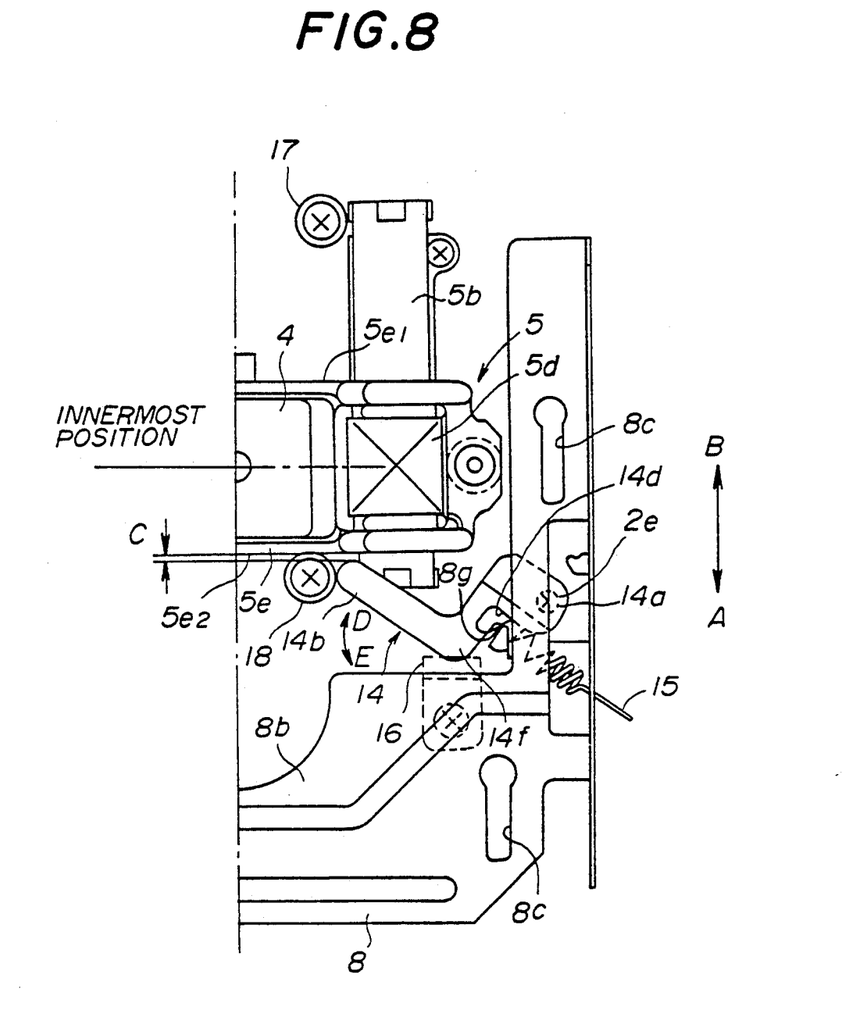
FIG. 8 is a partially enlarged plan view of the disk storage device in which the storage disk has been loaded.

As shown in FIG. 8, stoppers 17 and 18, which limits the range of movement of the supporting base 5e, are mounted on a part of the chassis 2 in the vicinity of the core 5b of the linear actuator 5. When the optical head 4 is located at a position corresponding to the outermost track on the disk, the stopper 17 comes into contact with a back end 5e₁ of the supporting base 5e. When the optical head 4 is located at a position corresponding to the innermost track on the disk, the stopper 18 comes into contact with a front end 5e₂ of the supporting base 5e.

Figure 5:
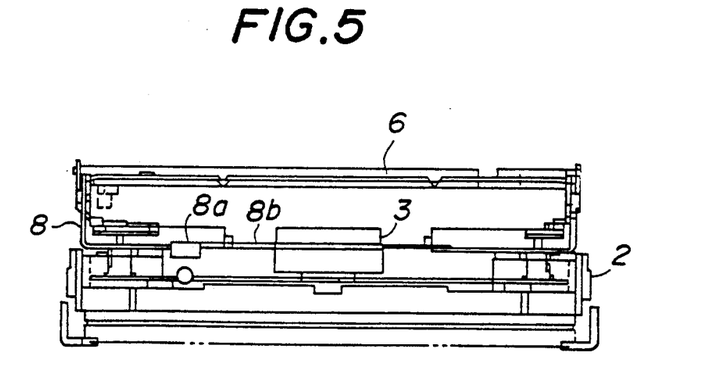
FIG. 5 is a front view of the disk storage device in an eject mode.

As shown in FIG. 5, the holder 6 is located at the eject position upwardly spaced apart from the slider 8 before the disk cartridge is inserted in the holder 6. Further, as shown in FIG. 6, the slider 8 comes into contact with the latch lever 11 and is kept stationary at a position obtained when the slider 8 has moved in the direction B.

When the disk cartridge is inserted into the holder 6, the latch lever 11 which keeps the slider 8 stationary is clockwise forced. Thus, the slider 8 is released from the engagement state, and the slider 8 slides in the direction A by the tension stress of the coil spring 10. As a result, the projections 6b which engage with the slope grooves 8f of the slider 8 are downwardly displaced, and hence the holder 6 downwardly moves, together with the disk cartridge, to the write/read position. In the way of insertion of the disk cartridge into the holder 6, the shutter is opened by the pivotable arm 7. Thus, the disk in the cartridge is placed on the turn table 3 by the descent of the holder 6, and approaches the optical head 4. At this time, since the slider 8 has been displaced in the direction A, as shown in FIG. 8 the lock lever 14 has been turned in the counterclockwise direction due to the tension stress of the coil spring 15, and has been in engagement with the stopper 16. Hence, the arm part 14b of the lock lever 14 has been shunted to a position spaced apart from the linear actuator 5.

The supporting base 5e of the linear actuator 5 moves along the cores 5a and 5b in such a manner that the supporting base 5e is guided by guide shafts 19 and 20. Thereby, the optical head 4 can be moved between the innermost track (located in the direction A) and the outermost track (located in the direction B). When the optical head 4 moves to the position corresponding to the innermost track, the front end 5e₂ of the supporting part 5e comes into with the stopper 18 and prevents the optical head 4 from further moving in the direction A. A gap C is created between the linear actuator 5 and the lock lever 14. With this gap C, the tracking operation of the optical head 4 is not prevented by the lock lever 14.

When the eject button 9 is depressed in the direction B after the read/write operation is completed, the slider 8 slides in the same direction and the projections 6b of the holder 6 are upwardly pressed in the state where the projections 6b engage with the slope grooves 8f. With this operation, the holder 6 upwardly moves, together with the disk cartridge, from the read/write position to the eject position. At the same time, the latch lever 11 is counterclockwise turned due to the function of an elastic force of the torsion spring 12, and hence the disk cartridge is ejected from the holder 6.

A description will now be given of the operation of the lock lever 14, which turns in cooperation with the eject operation. It is not necessary for the linear actuator 5 to generate a large amount of force in order to move, along the cores 5a and 5b, the optical head 4 and the supporting base supporting the coils 5a and 5b.

Figure 9:
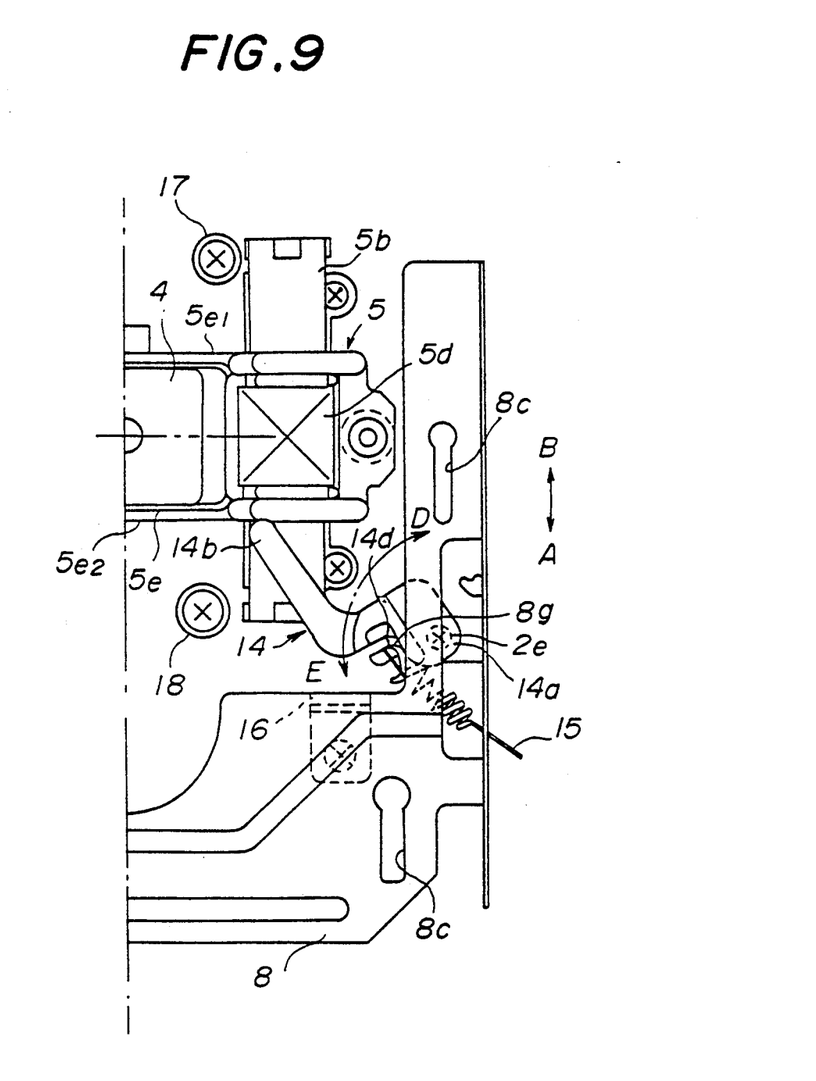
FIG. 9 is a partially enlarged plan view of the disk storage device showing an operation of a lock lever observed when the storage disk is ejected.

When the slider 8 slides in the direction B by the above-mentioned eject operation, as shown in FIG. 9 the engagement part 8g of the slider 8 is pressed against the wall 14d of the lock lever 14 in the same direction as the direction B. The lock lever 14 is turned around the shaft 2e in a direction D in the state where the force of the coil spring 15 is exerted on the lock lever 14 in a direction E. When the lock lever 14 turns in the direction D, the end of the arm 14b is brought into contact with the front end 5e₂ of the supporting base 5e. Hence, the supporting base 5e of the linear actuator 5 slides in the direction B due to the rotation of the lock lever 14 in the direction D.

Figure 10:
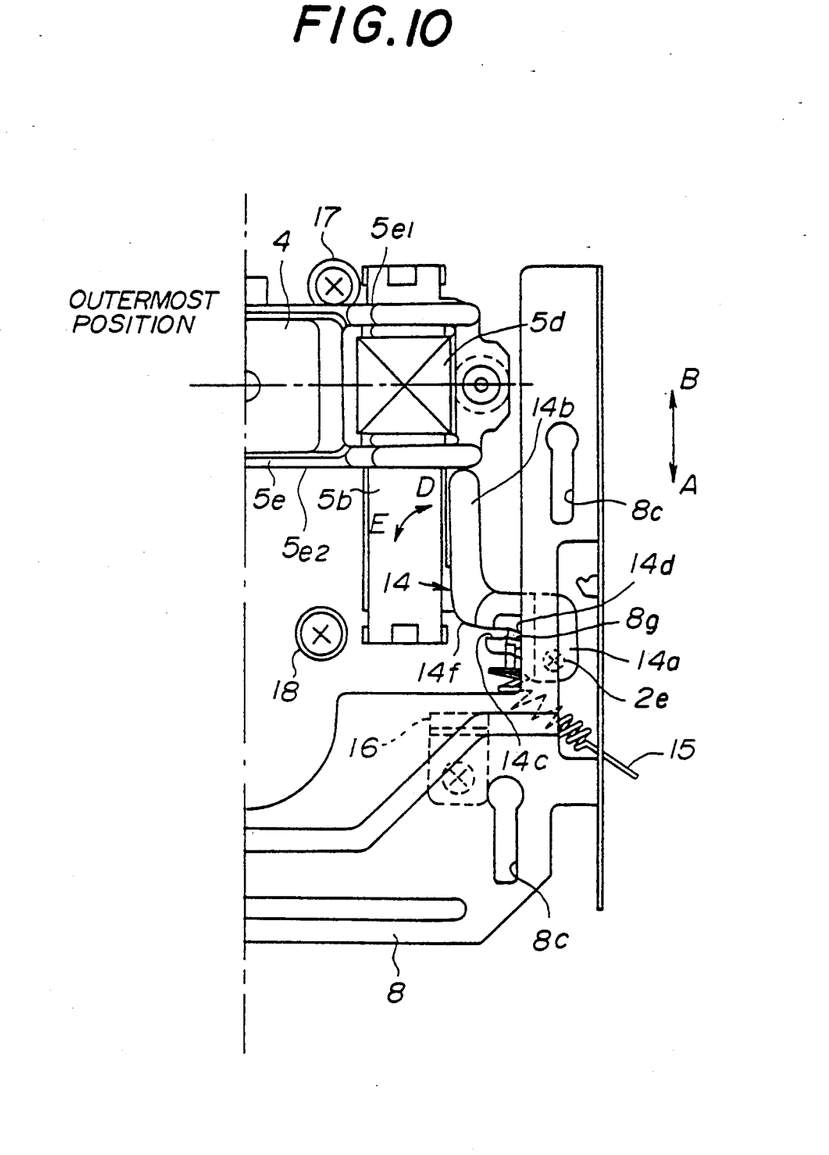
FIG. 10 is a partially enlarged plan view showing a lock lever which locks a part when the disk is ejected.

As shown in FIG. 10, when the slider 8 has moved to the eject position, the lock lever 14 has such an attitude that the arm part 14b runs in the direction B. The back end 5e₁ of the supporting base 5e is in engagement with the stopper 17. With this arrangement, the disk cartridge is ejected from the holder 6 and the optical head 4 is moved to the outermost track position due to the rotation of the lock lever 14. Further, the supporting base 5e is made stationary between the lock lever 14 and the stopper 17.

Since the lock lever 14 is made stationary in the state where the arm part 14b of the lock lever 14 runs in the direction B, it is very difficult for the lock lever 14 to move in a lock releasing direction (direction E) even if a force is exerted on the supporting base 5e in the direction A. In addition, the engagement part 8g of the lock lever 14 suppresses the movement of the lock lever 14 in the direction E until the slider 8 slides in the direction A.

With this arrangement, it becomes possible to prevent the supporting base 5e from forcibly hitting the stopper 17 or 18 and hence prevent the precision parts of the optical head 4 from being damaged. As a result, it becomes easy to carry or move the disk device 1 without special attention.

In addition, it becomes possible to omit the initializing operation which should be performed when the disk cartridge is inserted into the holder 6 because the optical head 4 is moved to the outermost track position due to the rotation of the lock lever 14 which is made when the disk cartridge is ejected therefrom. Hence, it becomes possible to simplify software installed in a control circuit of the disk storage device.

By inserting the disk cartridge into the holder 6, the slider 8 slides in the direction A. Hence, as the slider 8 is displaced in the direction A, the lock lever 14 is turned in the direction (direction E) reverse to the direction in which the lock lever 14 is turned when it is ejected. Thus, the linear actuator 5 is released from the locked state, and the tracking operation of the optical head 4 can be started.

In the embodiment as described above, the lock lever 14 cooperates with the slider 8. However, it is possible to design the mechanism so that the lock lever 14 cooperates with the holder 6. It is also possible to employ another mechanism for preventing the optical head 4 from moving in the state where the disk cartridge has been ejected.

In the embodiment as described above, the lock lever 14 is brought into contact with the supporting base 5e of the linear actuator 5. It is also possible to design the disk storage device so that the lock lever 14 is brought into contact with the optical head 4.

The present invention is not limited to the magneto-optic storage devices as described previously but includes different types of disk storage devices, such as magnetic disk devices.

What is claimed is:

1. A disk storage device comprising:

a head part which writes data into a storage disk loaded into the disk storage device and reads data from the storage disk;

a linear actuator for moving the head part in a first and a second radial direction of the storage disk;

an eject member which is operated to eject the storage disk;

a movement mechanism which moves the storage disk in a disk ejecting direction to an eject position in response to an operation of said eject member and which moves the storage disk in a disk loading direction to a read/write position, said movement mechanism having an engagement part moving with said movement mechanism in the disk loading and ejecting directions;

a stopper limiting movement of the head part in the first radial direction when the storage disk is at the eject position; and lock means having a pivotable lock member cooperating with the engagement part of the movement mechanism for keeping in response to the operation of said eject member, the head part stationary at the eject position, wherein said lock member moves towards the stopper and engages with one of the head part and the linear actuator in response to the operation of the eject member, said lock means further having urging means for urging said lock member away from said stopper, said urging means being overcome by the engagement part of the movement mechanism to move the lock member towards the stopper, and said lock member having a flat wall which engages the engagement part of the movement mechanism and which extends in parallel to the disk loading and ejecting directions when the storage disk is at the eject position so that the engagement part of the movement mechanism cannot move the pivotable lock member towards said stopper when the storage disk is at the eject position.

2. A disk storage device as claimed in claim 1, wherein said disk storage device further comprises means for preventing the lock member from moving away from the stopper after the eject member has been operated and the flat wall of the lock member extends parallel to the disk loading and ejecting directions, and for releasing said lock member to allow the lock member to move away from the stopper when the storage disk is inserted into the disk storage device.

3. A disk storage device as claimed in claim 1, wherein:

said lock member is a substantially L-shaped member having a long arm portion and a short arm portion;

said lock member turns around said short arm portion; and said long arm portion of the lock member is orientated in a direction substantially parallel to said radial directions when the storage disk is at the eject position.

4. A disk storage device as claimed in claim 3, wherein said long arm portion of the lock member has an end which comes into contact with one of said head part and said linear actuator.

5. A disk storage device as claimed in claim 1, wherein said head part has a flat wall with which said lock member comes into contact.

6. A disk storage device as claimed in claim 1, wherein said urging means comprises a coil spring.

7. A disk storage device as claimed in claim 1 further comprising a second stopper which comes into contact with one of said head part and said linear actuator when said head part is located at an innermost track position.

8. A disk storage device as claimed in claim 1, further comprising a second stopper which comes into contact with said lock member when said head part is located at an innermost track position.

9. A disk storage device as claimed in claim 1, wherein said head part comprises an optical head.

10. A disk storage device as claimed in claim 1, wherein said head part comprises a magnetic head.

* * * * *